US010266086B2

(12) United States Patent
Furuta

(10) Patent No.: US 10,266,086 B2
(45) Date of Patent: Apr. 23, 2019

(54) SEAT FRAME

(71) Applicant: TS TECH CO., LTD., Asaka-shi, Saitama (JP)

(72) Inventor: Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 280 days.

(21) Appl. No.: 15/037,540

(22) PCT Filed: Nov. 18, 2014

(86) PCT No.: PCT/JP2014/080522
§ 371 (c)(1),
(2) Date: May 18, 2016

(87) PCT Pub. No.: WO2015/076264
PCT Pub. Date: May 28, 2015

(65) Prior Publication Data
US 2016/0288683 A1 Oct. 6, 2016

(30) Foreign Application Priority Data
Nov. 19, 2013 (JP) .................................. 2013-239259

(51) Int. Cl.
B60N 2/68 (2006.01)
B60N 2/72 (2006.01)

(52) U.S. Cl.
CPC ............... B60N 2/68 (2013.01); B60N 2/682 (2013.01); B60N 2/72 (2013.01)

(58) Field of Classification Search
CPC ............ B60N 2/68; B60N 2/682; B60N 2/72
See application file for complete search history.

(56) References Cited

U.S. PATENT DOCUMENTS

| 4,685,739 A | 8/1987 | Deegener et al. |
| 6,074,004 A * | 6/2000 | Carmichael .......... B60N 2/4221 297/216.13 |
| 6,896,324 B1 * | 5/2005 | Kull ..................... B60N 2/4242 297/216.1 |

(Continued)

FOREIGN PATENT DOCUMENTS

| JP | 61-290911 A | 12/1986 |
| JP | 2000-108236 A | 4/2000 |

(Continued)

OTHER PUBLICATIONS

Office Action issued in related application CN 201480062818.4, dated Apr. 12, 2017, with machine generated English language translation, 13 pages.

Primary Examiner — Ryan D Kwiecinski
(74) Attorney, Agent, or Firm — Drinker Biddle & Reath LLP

(57) ABSTRACT

Provided is a seat frame including a resin material and able to secure high rigidity. The present disclosure relates to a seat frame that forms a framework of a vehicle seat on which an occupant sits, and that is formed of resin and to have a closed hollow cross-sectional shape. A resin material that forms at least a portion of the seat frame contains at least a unidirectional material which is a carbon fiber resin having a fiber orientation where fibers run in one direction, and the one direction in which the fibers of the unidirectional material run is a direction in which a tensile force is applied.

7 Claims, 10 Drawing Sheets

(56) References Cited

U.S. PATENT DOCUMENTS

| | | | |
|---|---|---|---|
| 2008/0190278 A1* | 8/2008 | Martin | F41H 5/0407 89/36.07 |
| 2008/0277987 A1 | 11/2008 | Deadrick | |
| 2013/0069415 A1* | 3/2013 | Yasuda | B60N 2/682 297/452.18 |
| 2013/0257131 A1* | 10/2013 | Nishiura | B60N 2/68 297/452.18 |
| 2014/0159462 A1* | 6/2014 | Matsumoto | B60N 2/68 297/452.18 |
| 2014/0327290 A1* | 11/2014 | Matsumoto | B60R 22/26 297/452.18 |
| 2015/0044402 A1* | 2/2015 | Carson, Jr. | A47C 5/12 428/34.5 |
| 2015/0044419 A1* | 2/2015 | Carson, Jr. | A47C 5/12 428/138 |
| 2015/0130254 A1* | 5/2015 | Yamaguchi | B60N 2/68 297/452.18 |
| 2015/0145313 A1* | 5/2015 | Lee | B60N 2/682 297/452.18 |
| 2015/0224901 A1* | 8/2015 | Furuta | B60N 2/68 297/452.18 |
| 2016/0339821 A1* | 11/2016 | Akaike | B60N 2/68 |
| 2017/0158104 A1* | 6/2017 | Le | B60N 2/809 |

FOREIGN PATENT DOCUMENTS

| | | |
|---|---|---|
| JP | 2004-322881 A | 11/2004 |
| JP | 2011-001008 A | 1/2011 |
| JP | 2011-178300 A | 9/2011 |
| JP | 2013-227007 A | 11/2013 |
| WO | 2013/146547 A1 | 10/2013 |

* cited by examiner

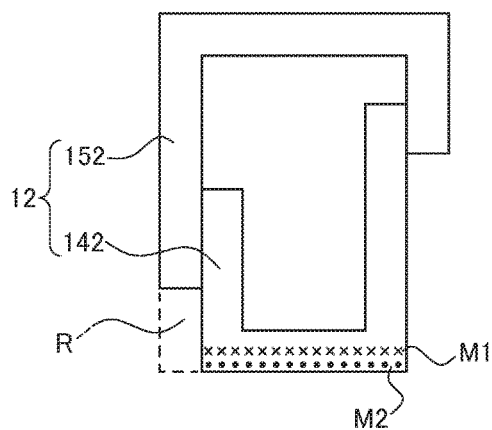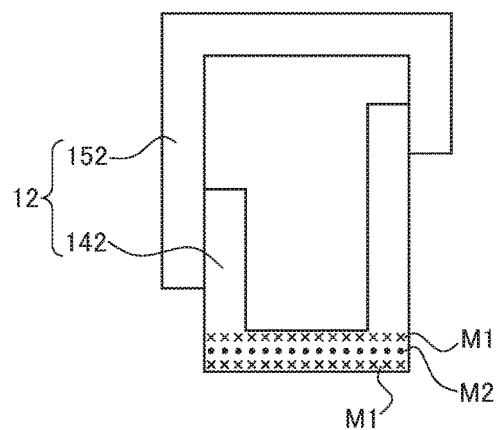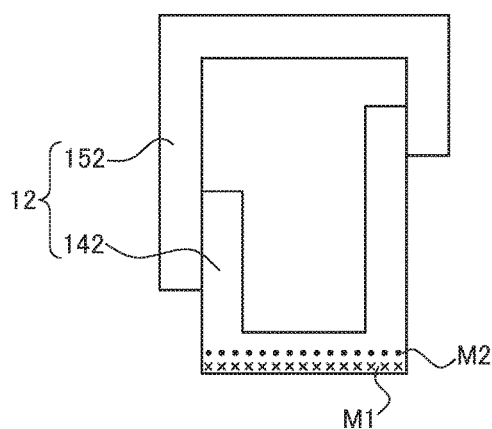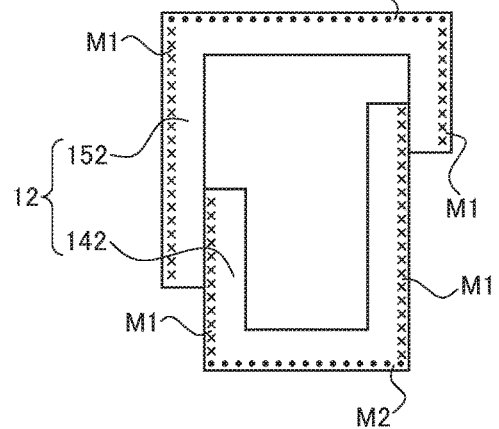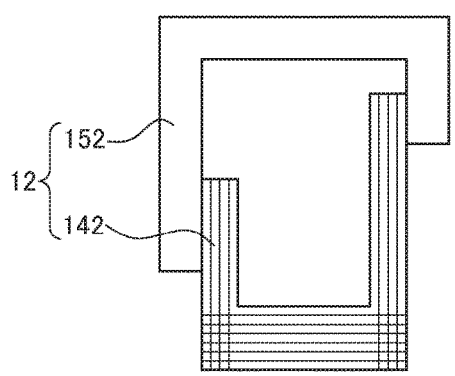

SEAT FRAME

CROSS-REFERENCE TO RELATED APPLICATIONS

This application is a National Stage Entry application of PCT Application No. PCT/JP2014/080522, filed Nov. 18, 2014, which claims the priority benefit of Japanese Patent Application No. 2013-239259, filed on Nov. 19, 2013, the contents being incorporated herein by reference.

BACKGROUND

The present disclosure relates to a seat frame provided at a vehicle seat on which an occupant sits, and particularly to a seat frame which is formed by combining frame sections made of a resin material.

In general, a vehicle seat is configured in such a manner that a cushion material is provided on a frame serving as a framework and that this cushion material is covered with a surface material. This frame serving as a framework is usually configured by a seat cushion frame serving as a framework of a seating portion and by a seat back frame serving as a framework of a backrest. A rear end of the seat cushion frame and a lower end of the seat back frame are attached directly or indirectly (indirectly, for example, via a reclining mechanism) to each other, thereby forming the frame. These frames are provided with not only structures serving as frameworks but also various members, and these members achieve various functions. As to function to support an occupant as described above, for example, an attachment portion to which a headrest for holding the head of the occupant is generally formed at an upper side of the seat back frame.

In order to form such frame, the frame requires high rigidity in view of supporting the weight of the occupant. In addition to this requirement, a reduction in weight of the vehicle seat itself is required; therefore, the technical development to meet both requirements which are generally contradicting has been needed. Under such circumstance, a technique to achieve both the weight reduction and rigidity of the frame has been proposed (for example, refer to Japanese Patent Publication JP 2011-001008A). According to the technique described in Japanese Patent Publication JP 2011-001008A, a diagonal tension wire is arranged at the outer side of a side frame forming a seat back frame and at the outer side of a side frame forming a seat cushion frame, thereby supporting an amount of difference between an impact load acting toward the vehicle front side and an impact load acting toward the vehicle rear side. Further, a closed cross-sectional structure is provided around a rim at a vehicle rear end portion of the side frame to extend in the vehicle up to down direction; thereby, the minimum radius of gyration is locally increased. With the structure just described, the frame rigidity can be secured by the technique according to Japanese Patent Publication JP 2011-001008A. Furthermore, a reinforcement component other than the light diagonal tension wire is not necessary, therefore contributing to weight reduction.

Moreover, from the perspective of formability and lightweight properties, a resin material has tended to be used as a material of a frame in recent years (for example, refer to Japanese Patent Publication JP 2004-322881A). In the technique of Japanese Patent Publication JP 2004-322881A, an inner half member and an outer half member which are formed of resin molded products are assembled to each other; thereby, a frame having a closed hollow cross-sectional shape is formed. In addition, such assembling is implemented by vibration-welding elongated projections for welding which are formed at the outer half member to a receiving portion for welding which is formed at the inner half member. Thus, in the technique according to Japanese Patent Publication JP 2004-322881A, a light resin material can be used instead of a metallic material; therefore, weight reduction can be achieved.

As described above, in a seat frame, both strength and weight reduction are desirable. In the technique of Japanese Patent Publication JP 2011-001008A, the diagonal tension wire needs to be arranged, therefore increasing the number of components and resulting in deterioration of manufacturing workability. Further, it takes time in forming, for example, forming the closed cross-sectional shape at the rim. Furthermore, as in Japanese Patent Publication JP 2004-322881A, a seat frame is formed by resin; thereby, weight reduction can be achieved. However, the rigidity of resin is lower than that of metal; therefore, the aspect of rigidity needs to be further elaborately designed.

In particular, the seat frame having a closed hollow cross-sectional shape has an empty space inside, therefore requiring to be further elaborately designed in order to secure rigidity. In recent years, from the perspective of formability and lightweight properties, a resin material has been used as a material of a seat frame. A frame body formed by such resin material may be configured in such a manner that an inner half member and an outer half member, which are formed of resin molded products, are assembled to each other to form a closed hollow cross-sectional shape. Under such circumstance, necessarily, the seat frame is formed by the resin material to achieve weight reduction and to secure higher rigidity.

SUMMARY

The present disclosure is made in view of the aforementioned problems, and various embodiments of the present disclosure provide a seat frame which is formed of a resin material and which provides high rigidity.

At least some of the problems described above are solved by various embodiments of a seat frame of the present disclosure, which forms a framework of a vehicle seat on which an occupant sits, the seat frame being made of resin and formed to have a closed hollow cross-sectional shape, wherein a resin material forms at least a portion of the seat frame and includes at least a unidirectional material which is a carbon fiber resin having a fiber orientation where fibers run in one direction, and wherein the one direction in which the fibers of the unidirectional material run is oriented in a direction in which a tensile force is applied.

As described above, in the present embodiment, the unidirectional material is used in at least a portion of the resin that forms the seat frame. Accordingly, higher strength is achieved as compared to a case where only resin material is used. Specifically, the unidirectional material where the carbon fibers are aligned to run in one direction is used. Thus, the unidirectional material is arranged in the direction in which the tensile force is applied; thereby, strength to the tensile force is increased and the seat frame having high strength to an applied force is provided.

In this case, the seat frame includes a seat back frame that supports the back of the occupant and a seat cushion frame that supports the buttocks of the occupant, wherein the seat back frame includes: two seat back side frames which are separated from each other in a vehicle width direction and which extend in an up to down direction to form lateral sides; and an upper frame which connects upper portions of the two seat back side frames, and wherein the unidirectional material is applied to the seat back side frames and the direction in which fibers of the unidirectional material run is oriented in a vehicle up to down direction in which the tensile force is applied.

In addition, more specifically, the seat back frame includes a frame main body of a closed hollow cross-sectional shape which is formed by combining a front frame which forms a front portion and a rear frame which forms a rear portion, wherein the front frame is formed into a reversed U-shape by two front side frames which form front portions of the seat back side frames and by a front upper frame which forms a front portion of the upper frame, and wherein the unidirectional material is used for at least a portion of the front side frames and the direction in which the fibers of the unidirectional material run is oriented in the up to down direction. With the structure just described, the strength of the seat back side frame of the seat back frame to which the tensile force in the up to down direction is applied is increased in the up to down direction. Moreover, this tensile force is mainly applied to a front surface of the seat back side frame and a compressive force is applied to a rear surface of the seat back side frame. Accordingly, the direction in which the carbon fibers of the unidirectional material run is applied to the front side frame; thereby, the strength of the seat back side frame is effectively increased.

As a more specific structure, preferably, the unidirectional material is arranged to be extended to an overlapped portion between the seat back side frames and the upper frame. As a still more specific structure, preferably, the upper frame is bent inward at an upper end of one of the seat back side frames to extend to the other of the seat back side frames and the unidirectional material extends along a bent shape of a bent portion which extends from the upper end of the seat back side frame to the upper frame. Moreover, an occupant support member attachment portion to which an occupant support member is locked is formed at the seat back side frame, the occupant support member being bridged between two of the seat back side frames to support the back of the occupant, and the unidirectional material is extended at least to a portion at which the occupant support member attachment portion is formed. With the structure just described, preferably, the seat back frame having high strength as a whole is provided.

In addition, preferably, a layered resin material where the unidirectional material and a cloth material are layered is used in at least a portion of the resin material that forms at least a portion of the seat frame, the cloth material including woven carbon fibers. As described above, the layered resin material is used in at least a portion of the resin that forms the seat frame; thereby, higher strength is achieved as compared to a case where a single resin material is used. Specifically, the unidirectional material where the carbon fibers are aligned to run in one direction and the cloth material where the carbon fibers are woven in a grid pattern are layered with each other to be used. Therefore, the unidirectional material is arranged in the direction in which the tensile force is applied; thereby, the strength to the tensile force is increased and the strength in the direction of the fibers of the cloth material is increased by the cloth material where the fibers run in the grid pattern. With the structure just described, the layered resin material having high strength to an applied force in each direction is provided, thereby increasing the strength of the seat frame.

Moreover, preferably, the layered resin material is configured with the cloth material layered as a surface layer. With the structure just described, for example, in a case where a hole or the like for arranging a component is cut in the layered resin material, the cut surface is effectively prevented from becoming frayed or cracked.

In such case, preferably, the seat back frame specifically includes a frame main body of a closed hollow cross-sectional shape which is formed by combining a front frame which forms a front portion and a rear frame which forms a rear portion, wherein the front frame is formed into a reversed U-shape by two front side frames which form front portions of the seat back side frames and by a front upper frame which forms a front portion of the upper frame, wherein the rear frame is formed into a reversed U-shape by two rear side frames which form rear portions of the seat back side frames and by a rear upper frame which forms a rear portion of the upper frame, and wherein the front side frames are configured by the layered resin material and the rear side frames are configured only by the cloth material. With the structure just described, the unidirectional material in which the carbon fibers run in the up to down direction is used for the front side frame to which the tensile force in the up to down direction is applied and the cloth material is used for the rear side frame to which a compressive force is applied, in order to resist against the compressive force. Thus, the seat frame which secures high strength to an applied force in each direction and which has higher strength is provided.

According to the present disclosure, the unidirectional material which has the high strength to the tensile force is used; thereby, the strength of the seat frame is increased. According to the present disclosure, the strength of the seat back side frame (more specifically, the front side frame) of the seat back frame to which the tensile force in the vehicle up to down direction is applied is increased in the vehicle up to down direction. According to various embodiments of the present disclosure, the seat back frame having the high strength as a whole is provided. According to an embodiment of the present disclosure, the layered resin material having the high strength to an applied force in each direction is formed, thereby increasing the strength of the seat frame. According to an embodiment of the present disclosure, the layered resin material can effectively prevent a surface from being damaged. According to an embodiment of the present disclosure, resins configured to have different fiber directions from each other are used for the front and rear sides configured so that forces are applied in a different manner; thereby, the high strength to an applied force in each direction is secured. As a result, the seat frame having the higher strength is provided.

BRIEF DESCRIPTION OF DRAWINGS

Various embodiments of the invention are illustrated in the drawings, in which:

FIG. 7A, FIG. 7B, FIG. 7C, FIG. 7D and FIG. 7E are cross-sectional schematic views illustrating the arrangement of each material of the seat back frame according to an embodiment of the present disclosure;

DETAILED DESCRIPTION

Figure 1:
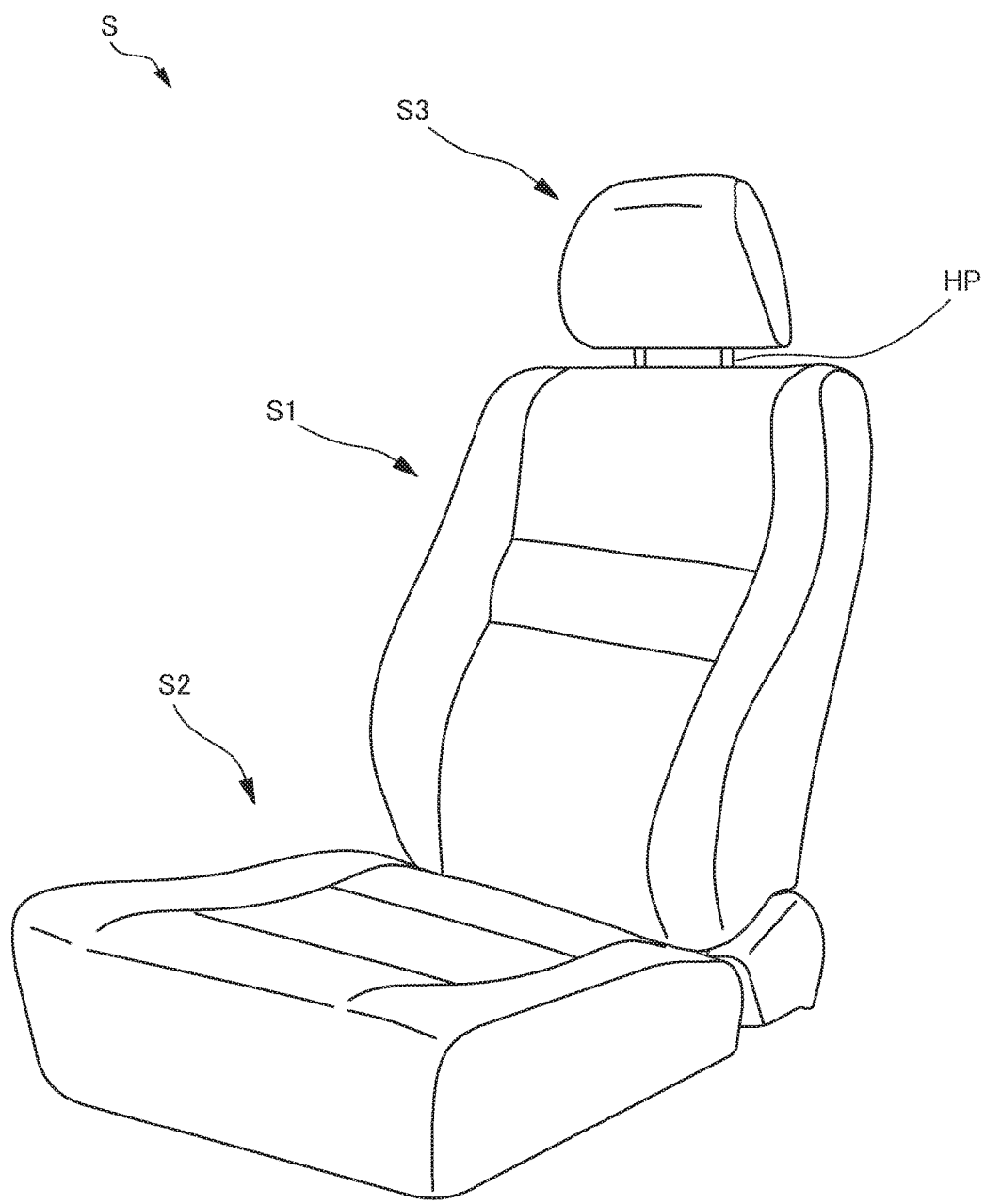
FIG. 1 is an outline, perspective view of a vehicle seat according to an embodiment of the present disclosure.
Figure 2:
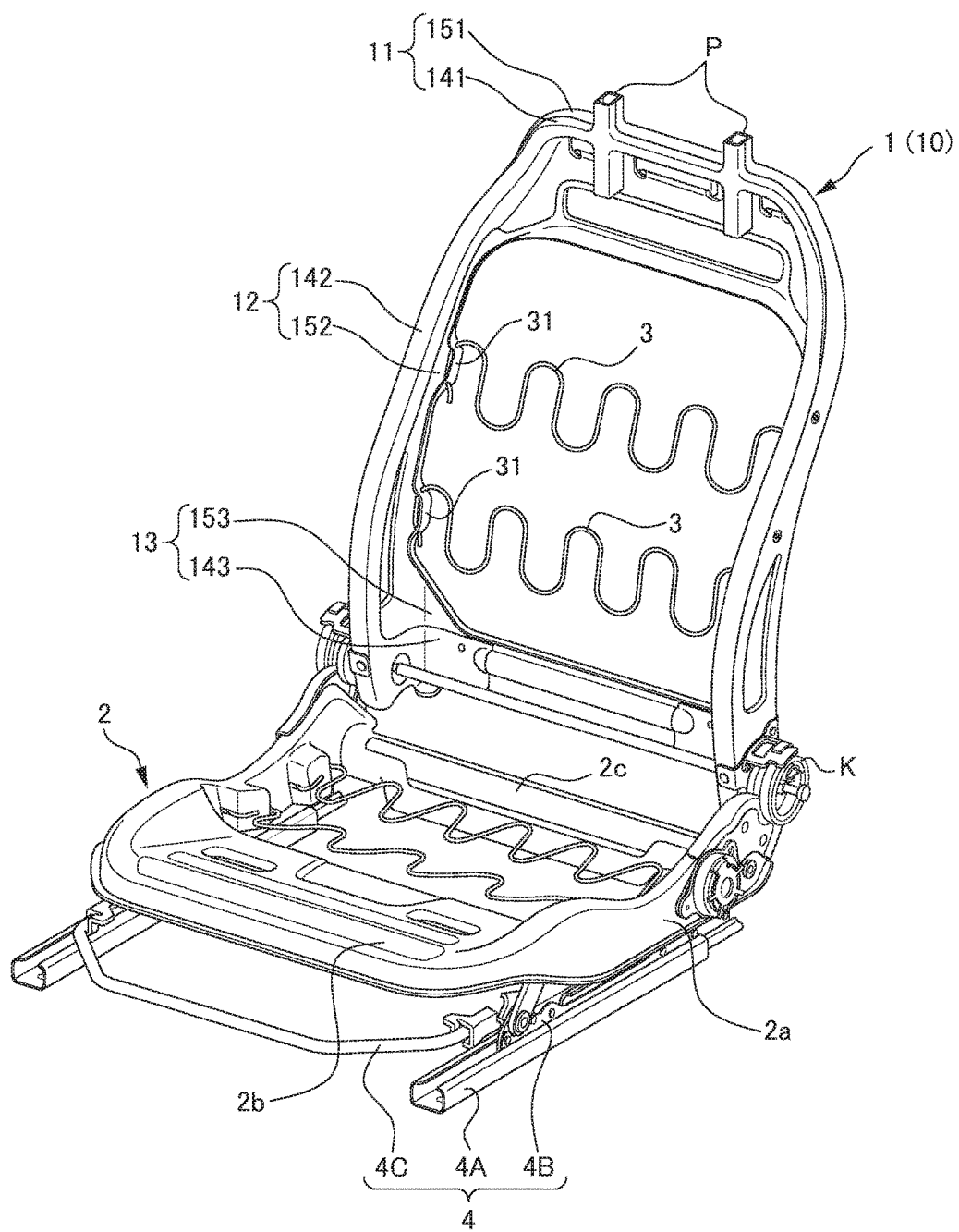
FIG. 2 is a perspective view of a seat frame of the vehicle seat according to an embodiment of the present disclosure.
Figure 3:
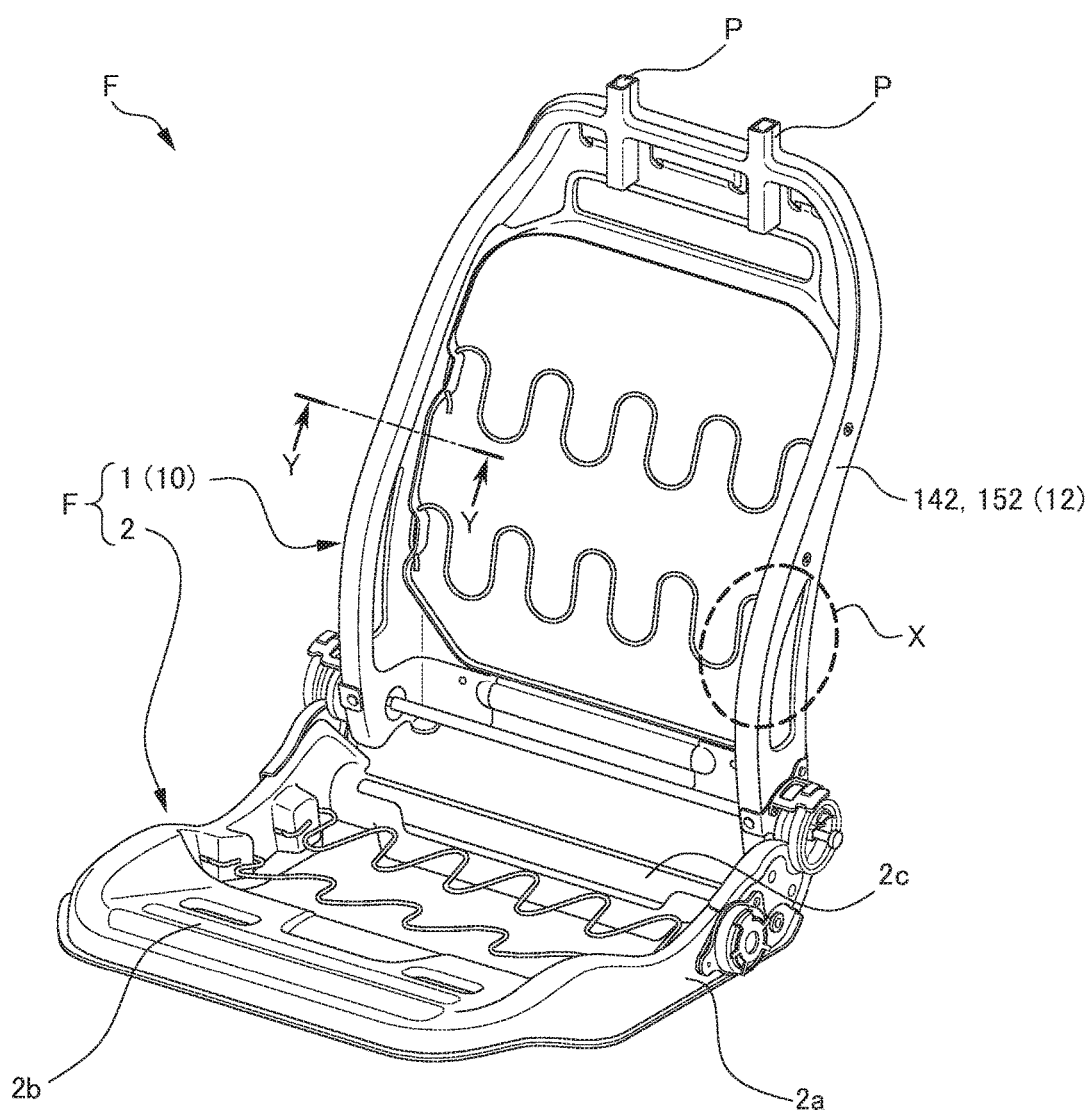
FIG. 3 is a perspective view of the seat frame according to the embodiment of the present disclosure.
Figure 4A:
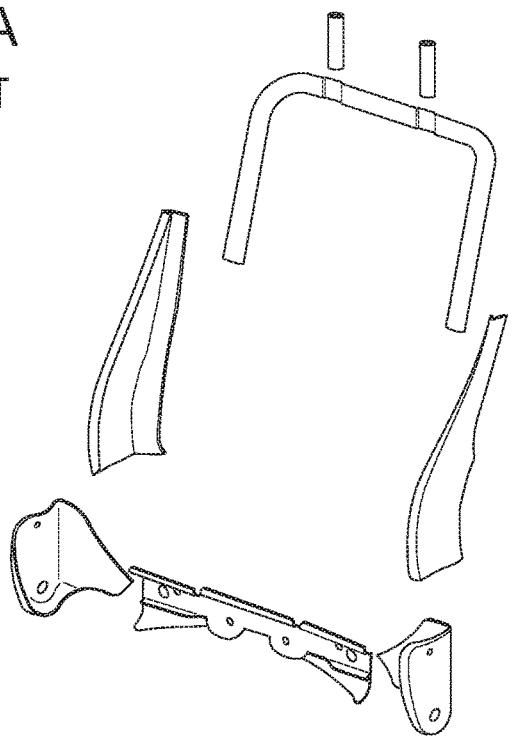
FIG. 4A and FIG. 4B are exploded views of seat back frames according to the prior art and an embodiment of the present disclosure, respectively.
Figure 4B:
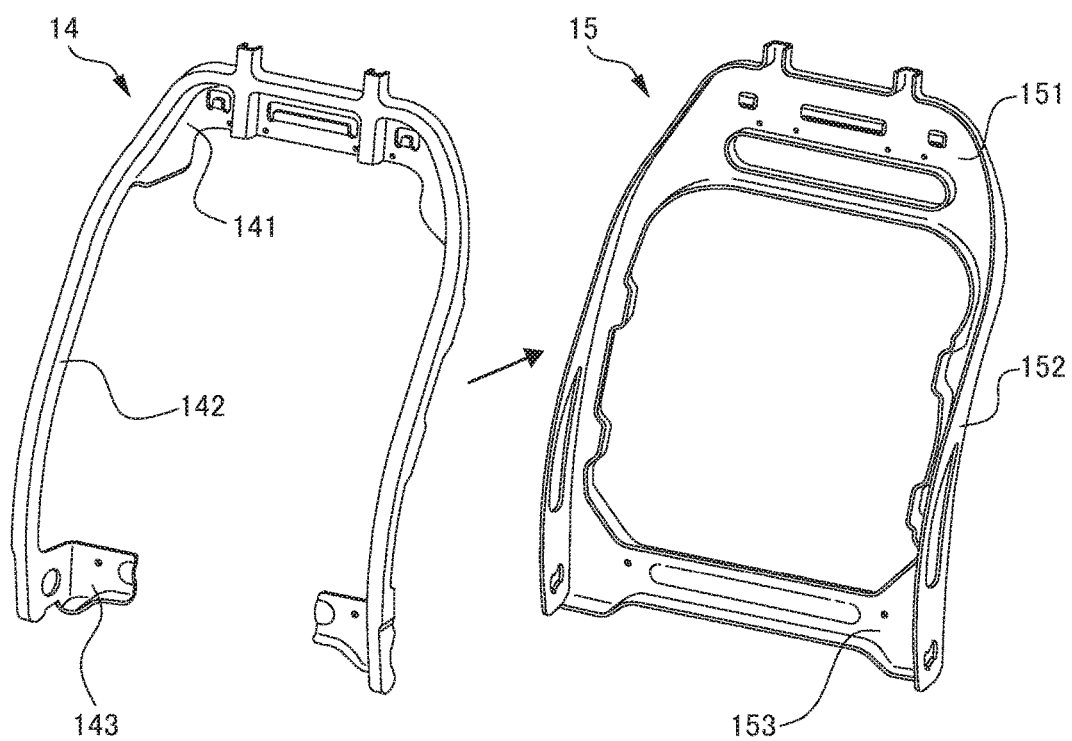
Figure 5A:
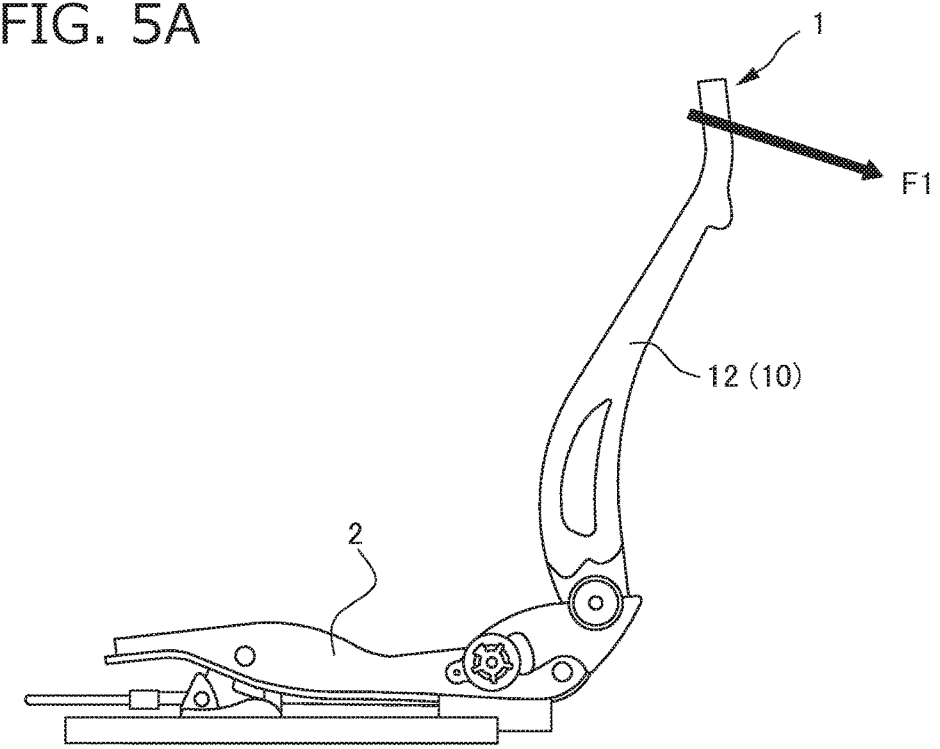
FIG. 5A and FIG. 5B are side view and perspective views of the seat back frame according to an embodiment of the present disclosure illustrating a direction in which a tensile load is applied when a rearward force is inputted.
Figure 5B:
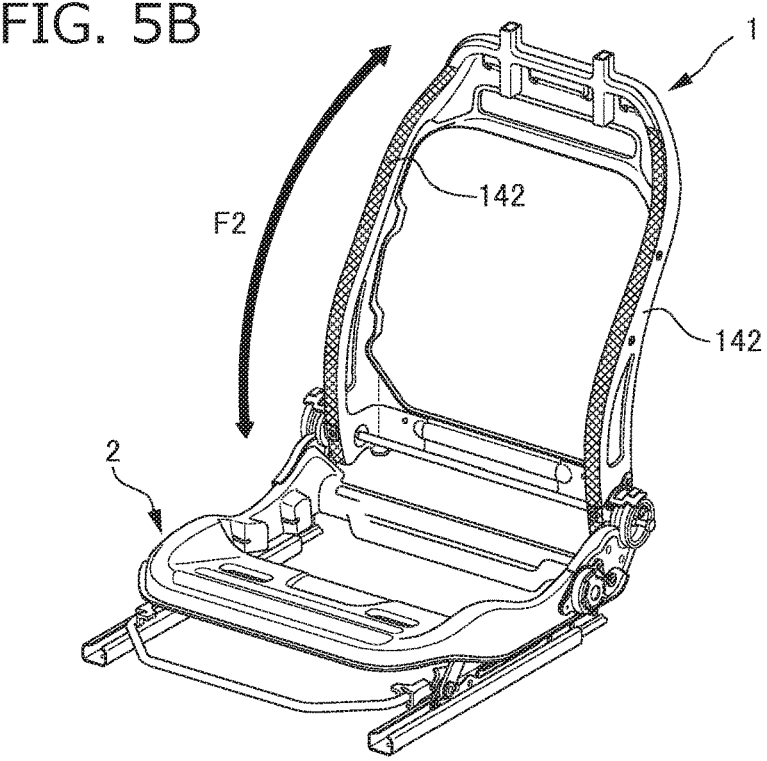
Figure 6:
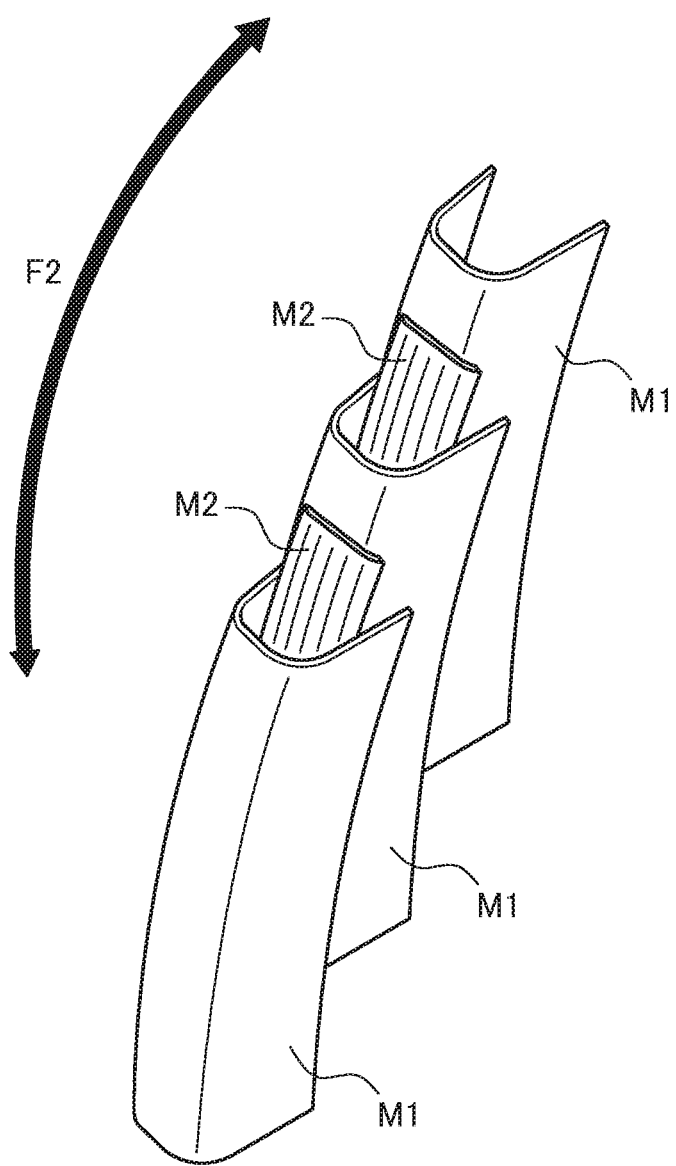
FIG. 6 is an enlarged schematic view of an X portion of FIG. 3.
Figure 8A:
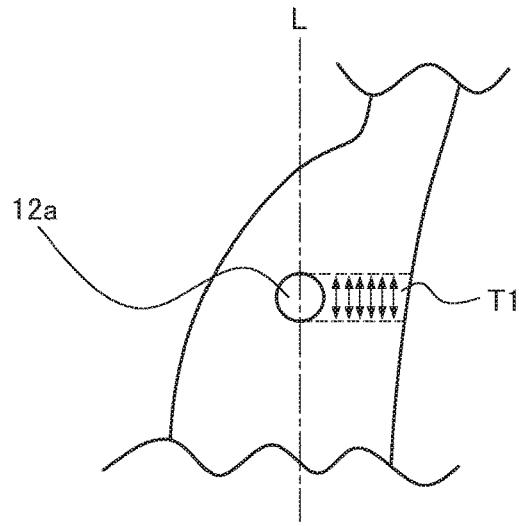
FIG. 8A, FIG. 8B and FIG. 8C are side, partial views illustrating the arrangement of each material of the seat back frame according to an embodiment of the present disclosure.
Figure 8B:
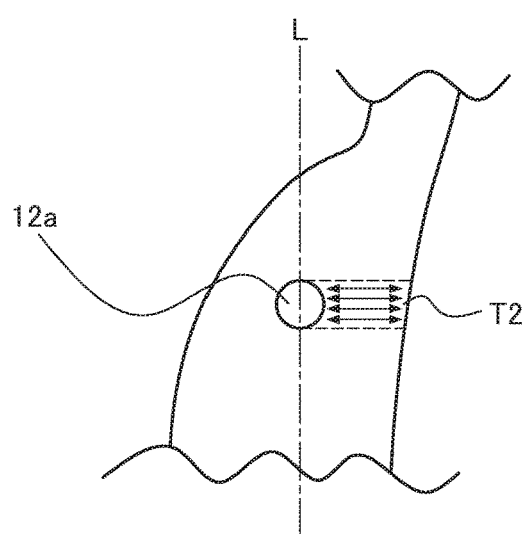
Figure 8C:
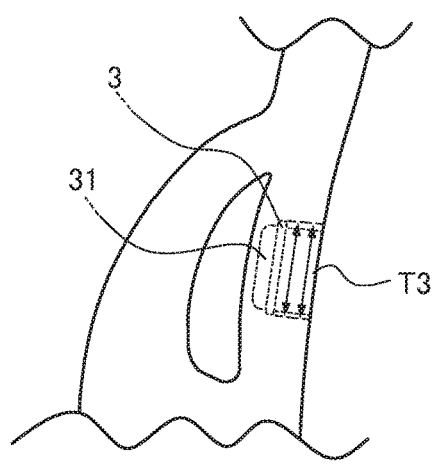
Figure 9A:
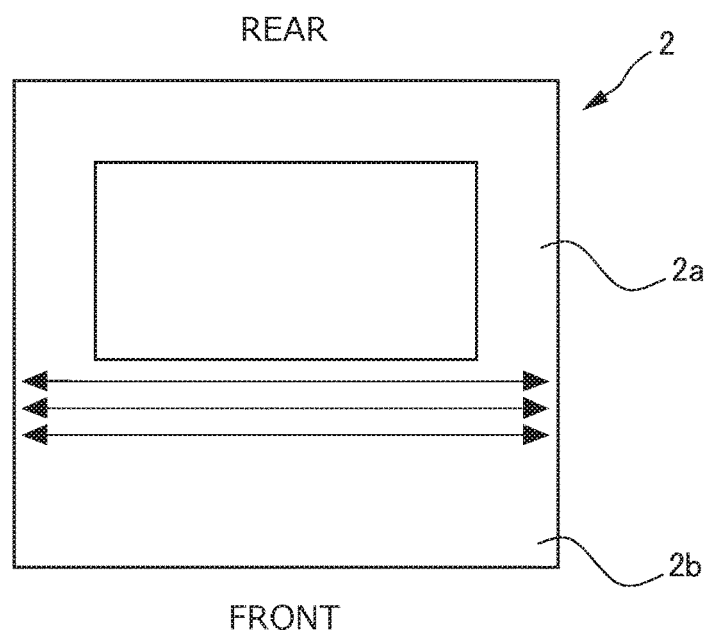
FIG. 9A and FIG. 9B are cross-sectional schematic views illustrating the fabric arrangement of a seat cushion frame according to an embodiment of the present disclosure.
Figure 9B:
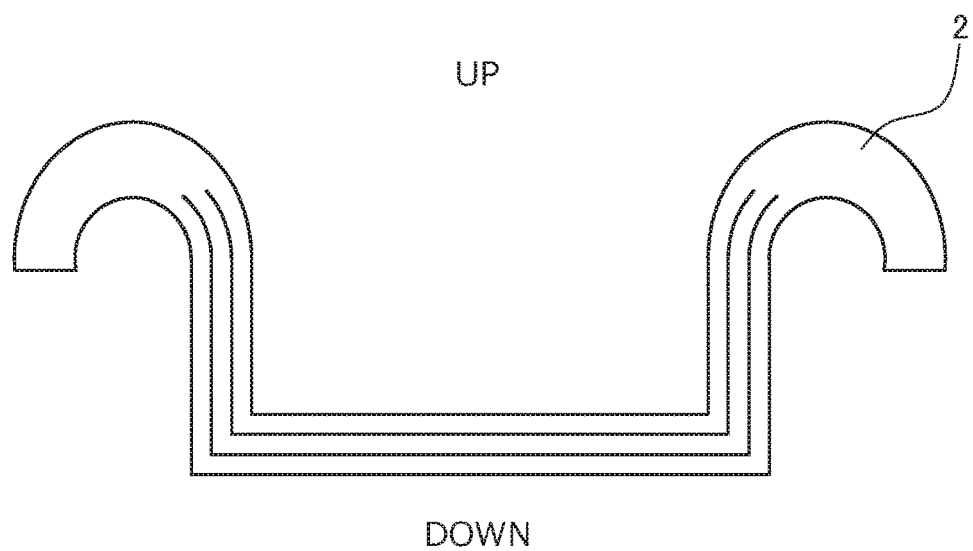
Figure 10A:
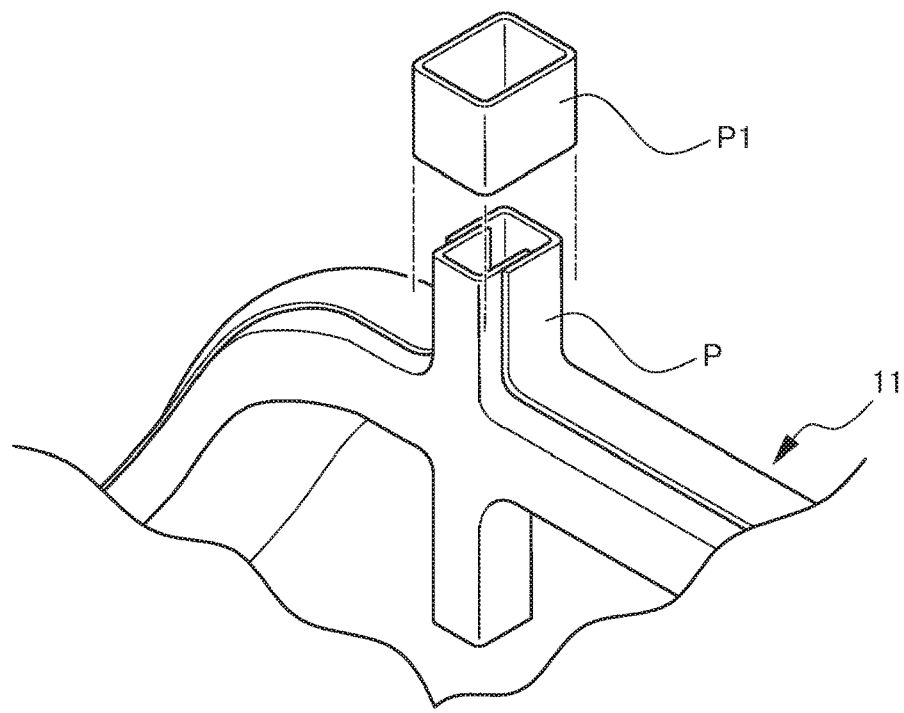
FIG. 10A and FIG. 10B are a partial, perspective exploded view and a cross-sectional schematic view, respectively, illustrating a reinforcement structure for a pillar arrangement portion according to an embodiment of the present disclosure.
Figure 10B:
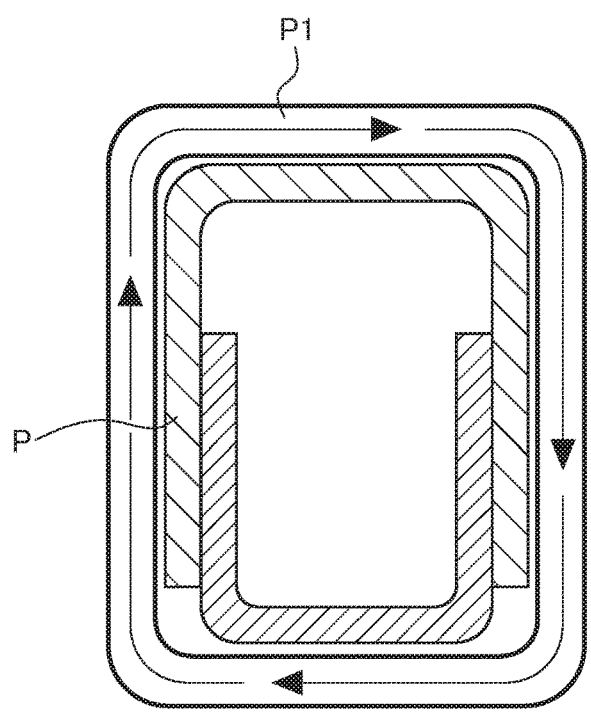

Herein, a vehicle seat according various embodiments of the present disclosure (hereinafter, referred to as "a present embodiment") is described with reference to FIG. 1 to FIG. 10. FIG. 1 to FIG. 10 illustrate various embodiments of the present disclosure. FIG. 1 is an outline, perspective view of a vehicle seat according to an embodiment of the present disclosure; FIG. 2 is a perspective view of a seat frame of the vehicle seat according to an embodiment of the present disclosure; FIG. 3 is a perspective view of the seat frame according to the embodiment of the present disclosure; FIG. 4A and FIG. 4B are exploded, perspective views of seat back frames according to an embodiment of the present disclosure; FIG. 5A and FIG. 5B are explanatory diagrams of the seat back frame according to the embodiment of the present disclosure illustrating a direction in which a tensile load is applied when a rearward force is inputted; FIG. 6 is an enlarged schematic view of an X portion of FIG. 3; FIG. 7A, FIG. 7B, FIG. 7C, FIG. 7D and FIG. 7E are cross-sectional schematic views illustrating the arrangement of each material of the seat back frame according to an embodiment of the present disclosure; FIG. 8A, FIG. 8B and FIG. 8C are side, partial views illustrating the arrangement of each material of the seat back frame according to an embodiment of the present disclosure; FIG. 9A and FIG. 9B are cross-sectional schematic views illustrating the fabric arrangement of a seat cushion frame according to an embodiment of the present disclosure; and FIG. 10A and FIG. 10B are a partial, perspective exploded view and a cross-sectional schematic view, respectively, illustrating a reinforcement structure for a pillar arrangement portion according to an embodiment of the present disclosure.

Here, in the description below, a front to back direction of the vehicle seat corresponds to a traveling direction of a vehicle and is hereinafter simply referred to as "a front to back direction". Further, a width direction of the vehicle seat corresponds to a direction identical to a horizontal width of the vehicle and is hereinafter simply referred to as "a width direction". Moreover, an up to down direction corresponds to an up to down direction of the vehicle. In addition, unless particularly specified, the configuration in a state where the vehicle seat is used in the vehicle, that is, in a state where an occupant is seated on the vehicle seat is stated in the description below. Directions and positions described in the description below correspond to those in the aforementioned state.

In addition, embodiments of the present disclosure are described with reference to the drawings; however, members, arrangements, or the like described blow are each an example of an embodiment and do not restrict the present disclosure. It is understood that the members, the arrangements, or the like may be variously modified in accordance with the scope of the present disclosure.

Basic Structure of Vehicle Seat S

A vehicle seat S according to an embodiment is described with reference to FIG. 1 and FIG. 2. The vehicles seat S according to an embodiment of the present disclosure (hereinafter, referred to as "the present embodiment") is a seat on which an occupant of the vehicle sits. As shown in FIG. 1, the vehicle seat S mainly includes a seat back S1 on which the occupant leans, a seat cushion S2 on which the buttocks of the occupant are laid, and a headrest S3 which supports the head of the occupant.

As described above, the vehicle seat S according to the present embodiment is formed by the seat back S1 (back portion), the seat cushion S2, and the headrest S3. The seat back S1 (back portion) and the seat cushion S2 are formed in such a manner that a cushion pad (not shown) mounted on a seat back frame 1 and a seat cushion frame 2 is covered with a surface material.

Further, the headrest S3 is configured in such a manner that a cushion pad material (not shown) provided at a head core (not shown) is covered with a surface material. Furthermore, a member indicated by symbol HP is a headrest pillar which supports the headrest S3.

A seat frame F of the vehicle seat S according to the present embodiment is configured to mainly include, as shown in FIG. 2, the seat back frame 1 forming the seat back S1 and the seat cushion frame 2 forming the seat cushion S2.

Seat Cushion Frame

As shown in FIG. 2, the seat cushion frame 2 according to the present embodiment is configured to have a substantially U-shaped frame body in the planar view. Particularly, in the present embodiment, the cushion frame 2 is integrally formed by carbon fiber reinforced plastic (CFRP) serving as a resin material. The seat cushion frame 2 is formed as the substantially U-shaped frame body in the planar view by two seat cushion side frame portions 2a which are in parallel with each other and separated in the width direction and which extend in the front to back direction and by a plate-shaped bridging pan 2b which is configured to be bridged between front portions of these seat cushion side frame portions 2a.

Further, rear ends of the two seat cushion side frame portions 2a are connected to each other by a connecting pipe 2c so that the connecting pipe 2c is bridged between the rear ends. Furthermore, although not shown, a submarine restraining pipe is bridged between front ends of the two seat cushion side frame portions 2a. This submarine restraining pipe is a pipe member that extends from one end to the other end in the width direction of the vehicle seat S, and it keeps a front portion of the vehicle seat S high to inhibit so-called "submarine phenomenon" in a case where a strong impact is applied at the time of a collision or the like.

This seat cushion frame 2 is supported by a leg portion, and a slide rail device 4 is connected to this leg portion. A publicly known device is applied to this slide rail device 4. For example, the slide rail device 4 is configured so that an inner rail 4B slides in the front to back direction relative to an outer rail 4A which is fixed on a vehicle body floor. The leg portion of the seat cushion frame 2 is attached to this inner rail 4B and its position is adjustable in the front to back direction in conjunction with the inner rail 4B sliding in the front to back direction between the leg portion and the outer rail that is arranged on the vehicle body floor. Further, an operating lever 4C is arranged to connect front ends of the inner rails 4B, 4B at the both sides. This operating lever 4C is a member formed of a pipe which is bent into a substantially U-shape and both free ends of the member are fixed to the inner rails 4B, 4B at the both sides.

Furthermore, in this case, a rear end of the seat cushion frame 2 is connected via a reclining mechanism K to the seat back frame 1. In the case of using a reclining mechanism, a publicly known mechanism may be applied. In addition, publicly known seat cushion frame and reclining mechanism may be applied to the seat cushion frame 2 and the reclining mechanism that will not be explained in detail because they are not directly related to the subject matter of this disclosure.

Seat Back Frame

Next, the seat back frame 1 according to the present embodiment is described. In addition, an example where the present disclosure is applied to the seat back frame 1 is described in the present embodiment, but is not limited thereto. The features of the present embodiment can be applied to other frames in other embodiments. As shown in FIG. 2 to FIG. 4, the seat back frame 1 is formed to include a frame main body 10 which forms a frame body of a rectangular shape when viewed from the front and two occupant support members 3 which are horizontally provided at upper and lower sides of the frame main body 10. Four occupant support member attachment portions 31 for locking these occupant support members 3 are formed at the frame main body 10. The two occupant support member attachment portions 31 are formed at either side in the right to left direction.

As shown in FIG. 4B, the frame main body 10 is configured to be divided into two portions in the front to back direction. That is, a front frame 14 having a substantially rectangular frame body which forms a front portion and a rear frame 15 having a substantially rectangular frame body which forms a rear portion are combined with each other, thereby forming the frame main body 10.

Conventionally, as shown in FIG. 4A, components (an upper frame, side frames, a lower frame, and components serving as pillar support members) made of a metallic material are connected to one another by welding, thereby forming a frame main body. In such case, eight components are needed and it takes time to perform welding operations for the components, respectively. However, in the present embodiment shown in FIG. 4B, the front frame 14 and the rear frame 15 are combined with each other, thereby forming the frame main body 10; therefore, two components may be enough (in addition, the front frame and the rear frame are combined with each other and are molded to form pillar support portions). Therefore, the number of components is significantly reduced and work efficiency is improved.

In the present embodiment, the front frame 14 and the rear frame 15 are made of CFRP as a resin material and molded by metallic molds. Further, sheets made of a resin material layered to frame shapes are set in the metallic molds, thereby molding the front frame 14 and the rear frame 15. Furthermore, a structure of this resin layer is a main component of the present disclosure; therefore, it is described in detail below.

Moreover, for illustrative purposes, a substantially trapezoidal portion forming an upper portion of the frame main body 10 is referred to as "an upper frame 11", and a pair of portions arranged to be separated from each other in the width direction is referred to as "side frames 12". In addition, a portion for connecting lower ends of the side frames 12 is referred to as "a lower frame 13". As described above, these portions form the substantially rectangular frame body when viewed from the front.

Further, as is obvious, both the front frame 14 and the rear frame 15 include a portion corresponding to the upper frame 11, a portion corresponding to the side frame 12, and a portion corresponding to the lower frame 13. Here, the portion that corresponds to the upper frame 11 is a portion of each of the front frame 14 and the rear frame 15, which forms the upper frame 11 when the front frame 14 and the rear frame 15 are combined with each other. The portion at the front side is referred to as "a front upper frame 141" and the portion at the rear side is referred to as "a rear upper frame 151".

Likewise, the portion that corresponds to the side frame 12 is a portion of each of the front frame 14 and the rear frame 15, which forms the side frame 12 when the front frame 14 and the rear frame 15 are combined with each other. The portion at the front side is referred to as "a front side frame 142" and the portion at the rear side is referred to as "a rear side frame 152". Further likewise, the portion that corresponds to the lower frame 13 is a portion that forms the lower frame 13 when the front frame 14 and the rear frame 15 are combined with each other. The portion at the front side is referred to as "a front lower frame 143" and the portion at the rear side is referred to as "a rear lower frame 153". In addition, in this case, the front lower frame 143 is not completely bridged between lower ends of the front side frames 142, 142 and an intermediate portion of the front lower frame 143 is cut out.

Further, as shown in FIG. 4, the front frame 14 and the rear frame 15 are combined with each other; thereby, the frame main body 10 having a hollow shape is formed. More specifically, for example, a cross-section when cut along a horizontal surface of the side frame 12 forms a closed cross-sectional structure.

The occupant support members 3 are provided to extend in directions along the upper frame 11 and the lower frame 13. In this case, the two occupant support members 3 are arranged in parallel with each other in the width direction. In the present embodiment, the occupant support members 3 are arranged within a substantially square-shaped opening which is surrounded by the upper frame 11, the side frames 12, and the lower frame 13 of the frame main body 10. In a normal use, the occupant support members 3 support an occupant seated on the vehicle seat S from behind. In addition, as described above, in this case, a lower end of the seat back frame 1 (specifically, the lower ends of the side frames 12, 12) are connected to the rear end of the seat cushion frame 2 via the reclining mechanism K.

Structure of Resin Material

The structure of the resin material according to the present embodiment is described on the basis of FIG. 5 to FIG. 12. Herein, an example where the resin material according to the present embodiment is applied to the seat back frame 1 is provided. As shown in FIG. 5A, an occupant leans on the seat back frame 1; therefore, a rearward input force F1 is generally applied. Thus, a tensile force F2 is mainly applied particularly to the front side frame 142 of the side frame 12 of FIG. 5B. The resin structure of the corresponding portion in the present embodiment is shown in FIG. 6.

FIG. 6 is an enlarged schematic view of an X portion of FIG. 3. In the present embodiment, a cloth material M1 and a unidirectional material M2 (hereinafter, referred to as "a UD material M2") are layered with each other, thereby forming a layered resin material M. Further, the cloth material M1 is a material of a CFRP material in which carbon fibers are arranged in a grid pattern. Furthermore, the UD material M2 is a material of a CFRP material in which carbon fibers are arranged in one direction.

In the present embodiment, as shown in FIG. 6, a five-layer structure, where three layers of the cloth materials M1 and two layers of the UD materials M2 are alternately stacked in a five-layer form, is applied. That is, the layered resin material M is formed by alternating layers of the cloth material M1, the UD material M2, the cloth material M1, the UD material M2, and the cloth material M1 stacked in the mentioned order. Further, in this case, a fiber direction in which the carbon fibers of the UD material M2 run is oriented in a direction of the tensile force F2.

In addition, in the present embodiment, the aforementioned five-layer structure is provided as an appropriately usable example; however, other embodiments of a layered structure are not limited thereto. Regarding the structure of the layered resin material M of the corresponding portion, detailed examples of various conditions are herein described on the basis of FIG. 7 to FIG. 9. FIG. 7 is a schematic view of a Y-Y cross section of FIG. 3. "X" marks show the cloth material M1 and black dots show the UD material M2. It is common to either example that a fiber direction in which the carbon fibers of the UD material M2 run is oriented in the direction in which the tensile force F2 is applied (regarding the side frame 12, the direction of the tensile force F2 corresponds to the up to down direction of the vehicle).

In the example shown in FIG. 7A, the UD material M2 is arranged at a front surface of the front side frame 142; thereby, density of the fibers arranged at the front and running in the up to down direction is high. With the structure just described, strength of the front surface of the front side frame 142 to the tensile force applied in the up to down direction is increased.

In addition, in this case, an end of a connecting portion of the rear side frame 152 with the front side frame 142 is not overlapped with the front of the front side frame 142 in the right to left direction of the vehicle. However, as shown in an R portion of FIG. 7A, the connecting portion of the rear side frame 152 with the front side frame 142 is extended to the front of the front side frame 142 where the UD material M2 is arranged (i.e., the end of this connecting portion is extended to be overlapped with the front of the front side frame 142 in the right to left direction of the vehicle); thereby, higher strength is preferably secured.

Further, in the example shown in FIG. 7B, the cloth material M1 is arranged at the front surface of the front side frame 142 and the UD material M2 is arranged in another layer (i.e., a layer arranged inwardly from the front surface). With such structure, the front of the front side frame 142 is configured by the cloth material M1. Therefore, for example, in a case where a hole or the like for arranging a component is cut in the front side frame 142, the cut surface may be effectively prevented from becoming frayed or cracked. Furthermore, the UD material M2 is arranged in the inward layer and the carbon fibers run in the up to down direction; therefore, the strength to the tensile force in the up to down direction is secured. In this case, preferably, the UD layer M2 is arranged in the second layer that is relatively close to the front surface of the front side frame 142.

In the example shown in FIG. 7C, a difference is made between densities of the carbon fibers of the UD material M2. That is, the front side frame 142 is structured so that the density of the carbon fibers running in the up to down direction is high at the front and is low in a portion which is curved rearward. With the structure just described, impact strength is increased and an increase in size is inhibited.

In the example shown in FIG. 7D, the front side frame 142 is structured so that the cloth materials M1, M1 are arranged respectively at the front and rear surfaces of the front and so that the UD material M2 is provided between these cloth materials M1, M1. With the structure just described, for example, in a case where a hole or the like for arranging a component is cut in the front side frame 142, the cut surfaces of the front and rear surfaces may be effectively prevented from becoming frayed or cracked.

In the example shown in FIG. 7E, the UD materials M2 are arranged at the front surface of the front of the front side frame and at a rear surface of the rear of the rear side frame; therefore, many of the carbon fibers running in the up to down direction are arranged at the front surface of the front of the front side frame and at the rear surface of the rear of the rear side frame. In addition, the cloth materials M1 are arranged at surfaces of the lateral sides.

Next, examples of FIG. 8 are explained. The examples of FIG. 8 are examples in a case where a pressure receiving member (not shown) is arranged instead of the occupant support members 3. In this case, a projected portion 12a which supports a movable member to pivot the movable member is formed at the side frame 12. Although not shown, such pressure receiving member is arranged in the substantially square-shaped opening that is surrounded by the upper frame 11, the side frames 12, and the lower frame 13 of the frame main body 10. A wire is projected from the pressure receiving member in the width direction of the vehicle and an end of this wire is attached to the movable member (not shown) that is pivotally supported by the projected portion 12a. In addition, in a case where an impact load greater than a predetermined load is applied to the pressure receiving member by a rear-end collision or the like, the movable member is moved to the rear side of the vehicle by the impact load transmitted via the wire and the pressure receiving member is moved rearward; therefore, an occupant is moved rearward. This movement of the movable member to the rear side of the vehicle can significantly move the pressure receiving member to the rear side of the vehicle. As a result, the occupant is moved rearward; therefore, a load applied to the occupant is effectively reduced.

In the present embodiment, as shown in FIG. 8, in a case where a vertical line L passing through this projected portion 12a (a line perpendicular to a vehicle floor) is drawn, a rearward portion T1 from the projected portion 12a relative to this vertical line L is configured so that the number of carbon fibers running in the up to down direction is smaller than the number of carbon fibers in a forward portion relative to the rearward portion T1. Therefore, in a case where a strong impact load is applied to the pressure receiving member, an amount of sinking is further effectively secured. FIG. 8A shows the example where in the rearward portion T1, the number of carbon fibers running in the up to down direction is small. FIG. 8B shows the example where in a rearward portion T2, carbon fibers run in the front to back direction. In the example shown in FIG. 8B, the carbon fibers are configured to run in the front to back direction; thereby, in a case where a strong impact load is applied to the pressure receiving member, the amount of sinking is further effectively secured. In addition, the number of carbon fibers in the rearward portion is smaller than the number of carbon fibers in the forward portion; thereby, the amount of sinking is still further, effectively secured. In the example of FIG. 8C, the number of carbon fibers in a rearward portion T3 relative to the occupant support member attachment portion 31 is smaller than the number of carbon fibers in a forward portion relative to the rearward portion T3. With the structure just described, in a case where a strong impact load is applied to the occupant support member 3, the amount of sinking is further effectively secured.

Next, an example of the seat cushion frame 2 is described on the basis of FIG. 9. In an example of FIG. 9A, the UD material M2 is used for the bridging pan 2b of the seat cushion frame 2 so that carbon fibers running in the right to left direction of the vehicle are increased. With this structure, an effect to inhibit the so-called "submarine phenomenon" is provided. Further, in this case, preferably, the UD material M2 is arranged so that the carbon fibers are provided at a location along an opening end (i.e., an inner portion of a U-shaped portion) of the seat cushion frame 2 to run in the right to left direction of the vehicle. In other words, preferably, the UD material M2 is arranged so that the carbon fibers are provided at the front of the opening to run in the right to left direction of the vehicle.

Further, as shown in FIG. 9B, in a case where a recessed portion serving as a buttocks receiving portion is provided in the seat cushion frame 2, it is preferable that the UD material M2 is arranged so that the carbon fibers run along the shape of this recessed portion. Furthermore, it is preferable the UD materials M2 are arranged symmetrically in the right to left direction of the vehicle.

In addition, in this case, it is common to either example that the fiber direction in which the carbon fibers of the UD material M2 run is oriented in the direction in which the tensile force F2 is applied (regarding the side frame 12, the direction of the tensile force F2 corresponds to the up to down direction of the vehicle). However, instead of completely extending along the tensile force F2, the direction in which the carbon fibers run may be at a slight angle with the direction in which the tensile force F2 acts. With the structure just described, an area to which a torsional force is applied can preferably secure strength to this torsional force.

Next, a reinforcement structure for a pillar arrangement portion P is described on the basis of FIG. 10. In this example, a square tubular reinforcement member P1 is formed by the UD material M2, and the reinforcement member P1 is arranged to cover an outer periphery of the pillar arrangement portion P. In such case, the direction in which the carbon fibers of the UD material M2 run is established to extend in the peripheral direction. That is, the carbon fibers run in the peripheral direction as indicated arrows of FIG. 10B. In addition, the arrows are indicated in FIG. 10B in order to visually illustrate that the carbon fibers run in the peripheral direction. These arrows indicate only the concept that "the carbon fibers run in the peripheral direction". That is, the arrows do not indicate one direction while not meaning vectors. With such structure, higher strength of the pillar arrangement portion P is secured.

Further, regarding an area where the unidirectional material M2 is arranged, the unidirectional material M2 is arranged to be extended at least to an overlapped portion between the side frame 12 and the upper frame 11. More preferably, the unidirectional material is arranged to be extended to an overlapped portion between the front side frame 142 and the front upper frame 141. Furthermore, in a bent portion formed at the overlapped portion between the side frame 12 and the upper frame 11 (more preferably, in a bent portion formed at the overlapped portion between the front side frame 142 and the front upper frame 141), the carbon fibers run along this bent shape. Therefore, higher strength is achieved. Moreover, the unidirectional material M2 is extended to a position in which the occupant support member attachment portion 31 is formed; therefore, a load application portion is more preferably enhanced.

Still further, as a preferably applicable example, the unidirectional material M2 or the layered resin material M of the unidirectional material M2 and the cloth material M1 may be used for the front side frame 142 (in such case, the carbon fibers run in the up to down direction) and only the cloth material M1 may be used for the rear side frame 152. With the structure just described, the unidirectional material M2 for strengthening in the up to down direction may be used for the front portion to which the tensile force in the up to down direction is further applied, and the cloth material M1 may be used for the rear portion to which a compressive force is applied. Therefore, strength is further effectively increased.

TABLE OF REFERENCE NUMERALS

S: vehicle seat
S1: seat back
S2: seat cushion
S3: headrest
F: seat frame
1: seat back frame
  10: frame main body
  11: upper frame
  12: side frame
    12a: projected portion
  13: lower frame
  14: front frame
    141: front upper frame
    142: front side frame
    143: front lower frame
  15: rear frame
    151: rear upper frame
    152: rear side frame
    153: rear lower frame
  P: pillar arrangement portion
    P1: reinforcement member
2: seat cushion frame
    2a: seat cushion side frame portion
    2b: bridging pan
    2c: connecting pipe
3: occupant support member
  31: occupant support member attachment portion
4: slide rail device
  4A: outer rail
  4B: inner rail
  4C: operating lever
K: reclining mechanism
M: layered resin material
  M1: cloth material
  M2: UD material (unidirectional material)
HP: headrest pillar

The invention claimed is:

1. An apparatus, comprising:
a seat frame that forms a framework of a vehicle seat on which an occupant sits, the seat frame being made of resin and formed to have a closed hollow cross-sectional shape;
wherein the seat frame comprises a seat back frame that supports a back of the occupant and a seat cushion frame that supports a buttocks of the occupant;
wherein the seat back frame includes a frame main body having the closed hollow cross-sectional shape that is formed by a front frame that forms a front portion of the seat back frame and a rear frame that forms a rear portion of the seat back frame;

wherein the seat back frame comprises two seat back side frames that are separated from each other in a seat frame width direction and that extend in an up to down direction to form lateral sides;

wherein the front frame comprises two front side frames that form front portions of the seat back side frames;

wherein the rear frame comprises two rear side frames that form rear portions of the seat back side frames;

wherein a resin material forms at least a portion of the seat frame and includes at least a unidirectional material that is a carbon fiber resin having a fiber orientation where fibers run in one direction;

wherein the one direction in which the fibers of the unidirectional material run is oriented in a direction in which a tensile force is applied; and wherein the front side frames are formed by the unidirectional material in which carbon fibers run in the up to down direction and the rear side frames are formed by a cloth material in which carbon fibers are woven.

2. The apparatus according to claim 1, wherein the seat back frame further comprises an upper frame that connects upper portions of the two seat back side frames; and wherein the front frame is formed as a reversed U-shape by the two front side frames and a front upper frame that forms a front portion of the upper frame.

3. The apparatus according to claim 2, wherein the unidirectional material is arranged to be extended to an overlapped portion between the seat back side frames and the upper frame.

4. The apparatus according to claim 2, wherein the seat back frame further comprises a curved portion that is curved inward from an upper end of the seat back side frame to the upper frame and that connects the upper end of the side frame and the upper frame; and wherein the unidirectional material extends along a curved shape of the curved portion.

5. The apparatus according to claim 1, wherein an occupant support member attachment portion to which an occupant support member is locked is formed at the seat back side frame, the occupant support member being bridged between the two seat back side frames to support the back of the occupant; and wherein the unidirectional material is extended at least to a portion at which the occupant support member attachment portion is formed.

6. The apparatus according to claim 1, wherein a layered resin material where the unidirectional material and the cloth material are layered is used in at least a portion of the resin material that forms at least a portion of the front side frame, the cloth material including woven carbon fibers.

7. The apparatus according to claim 6, wherein the layered resin material is formed with the cloth material layered as a surface layer.

* * * * *